(12) United States Patent
Fukuyama et al.

(10) Patent No.: US 10,661,850 B2
(45) Date of Patent: May 26, 2020

(54) FRONT STRUCTURE OF SADDLED VEHICLE

(71) Applicant: Honda Motor Co., Ltd., Tokyo (JP)

(72) Inventors: Kei Fukuyama, Kumamoto (JP); Sekai Yamazaki, Asaka (JP); Yasushi Takahashi, Tokyo (JP); Souichiro Makino, Kumamoto (JP)

(73) Assignee: HONDA MOTOR CO., LTD., Minato-ku, Tokyo (JP)

( * ) Notice: Subject to any disclaimer, the term of this patent is extended or adjusted under 35 U.S.C. 154(b) by 223 days.

(21) Appl. No.: 15/900,471

(22) Filed: Feb. 20, 2018

(65) Prior Publication Data

US 2018/0265152 A1    Sep. 20, 2018

(30) Foreign Application Priority Data

Mar. 16, 2017    (JP) .................................. 2017-051080

(51) Int. Cl.
*B62J 6/00* (2020.01)
*B62J 6/02* (2020.01)
(Continued)

(52) U.S. Cl.
CPC .    *B62J 6/01* (2020.02); *B62J 6/02* (2013.01); *B62J 11/19* (2020.02); *B62J 99/00* (2013.01);
(Continued)

(58) Field of Classification Search
CPC ...... B62J 6/001; B62J 6/02; B62J 2099/0033; B62J 2099/004; B62K 11/04; B62K 21/04; B62K 21/18
See application file for complete search history.

(56) References Cited

U.S. PATENT DOCUMENTS 4,032,168 A * 6/1977 Emerson ................ B62K 11/14
                                                  280/279
8,041,507 B2 * 10/2011 Ieda ....................... B62K 19/30
                                                  224/413
(Continued)

FOREIGN PATENT DOCUMENTS

EP          0654383 A2    5/1995
JP       2009-161011 A    7/2009

OTHER PUBLICATIONS

Extended European Search Report dated Jul. 30, 2018 in a corresponding European patent application No. 18156213.3, 6 pp.

*Primary Examiner* — Tony H Winner
(74) *Attorney, Agent, or Firm* — United IP Counselors, LLC (57) ABSTRACT

A front structure of a saddled vehicle having a meter unit of a less thickness and rendering meter-side and wiring-side couplers hardly visible from the outside is disclosed. The front structure includes a stem shaft rotatably mounted through a head pipe disposed in a front portion of a vehicle body frame and steerably supporting a front wheel, a top bridge coupling the stem shaft with a handle, a meter unit disposed in front of the top bridge and including a meter display on a top face of the meter unit, a meter-side coupler disposed on the meter unit, and a wiring-side coupler disposed on a side of wiring connected to the meter-side coupler, wherein the meter unit includes a coupler support member extending behind the meter display and supporting the meter-side coupler, and the coupler support member is disposed below the top bridge.

11 Claims, 7 Drawing Sheets

(51) Int. Cl.
*B62J 6/18* (2006.01)
*B62K 21/18* (2006.01)
*B62J 6/01* (2020.01)
*B62J 99/00* (2020.01)
*B62K 11/04* (2006.01)
*B62K 21/04* (2006.01)
*B62J 11/19* (2020.01)
*B62J 45/00* (2020.01)
*B62J 50/21* (2020.01)

(52) U.S. Cl.
CPC .............. *B62K 11/04* (2013.01); *B62K 21/04* (2013.01); *B62K 21/18* (2013.01); *B62J 45/00* (2020.02); *B62J 50/225* (2020.02)

(56) References Cited

U.S. PATENT DOCUMENTS

| | | | | |
|---|---|---|---|---|
| 8,506,000 | B2* | 8/2013 | Hasegawa | B62J 99/00 296/70 |
| 8,628,103 | B2* | 1/2014 | Kawai | B62J 99/00 180/219 |
| 10,011,315 | B2* | 7/2018 | Ishii | B62J 29/00 |
| 10,029,751 | B2* | 7/2018 | Ueno | B62K 11/14 |
| 2004/0094347 | A1* | 5/2004 | Kakizoe | B60Q 1/0041 180/219 |
| 2007/0247866 | A1* | 10/2007 | Domergue | B60Q 1/0035 362/547 |
| 2008/0298078 | A1* | 12/2008 | Miyamoto | B62J 6/02 362/474 |
| 2010/0025140 | A1* | 2/2010 | Takenaka | B62K 11/14 180/219 |
| 2019/0301903 | A1* | 10/2019 | Hamaguchi | B62J 99/00 |

* cited by examiner

FRONT STRUCTURE OF SADDLED VEHICLE

CROSS-REFERENCE TO RELATED APPLICATIONS

This application claims the benefit of priority to Japanese Patent Application No. 2017-051080, filed on Mar. 16, 2017, the entire contents of which are hereby incorporated by reference.

BACKGROUND

1. Technical Field

The present invention relates to a front structure of a saddled vehicle.

2. Description of the Background

As described in Patent Literature 1 (mainly in FIG. 4) for example, a conventional front structure of a saddled vehicle includes a head pipe 21 disposed in a front portion of a vehicle body frame 22, a stem shaft 5 rotatably provided to the head pipe 21 and steeringly supporting a front wheel 3, a top bridge 7 coupling the stem shaft 5 with a handle 9, and a meter unit 41 disposed in front of the top bridge 7 and including a meter display on the top face of the meter unit 41, a meter-side coupler for the meter unit 41, and a wiring-side coupler provided for wiring where the meter-side coupler is connected.

CITATION LIST

Patent Literature 1: Japanese Patent Application Publication 2009-161011A

BRIEF SUMMARY

In the above conventional front structure of a saddled vehicle, the meter-side coupler is disposed on the lower face (or the front face) of the meter unit, and the wiring-side coupler is connected to the meter-side coupler. This configuration undesirably increases the total thickness of the meter unit.

Moreover, the meter-side and wiring-side couplers are easily viewed from the outside.

The present invention was made in view of the above problems, and is to provide a front structure of a saddled vehicle, the structure having a meter unit of a less thickness in total than before and being capable of rendering the meter-side and wiring-side couplers hardly visible from the outside.

In order to address the above problems, one or more aspects of the present invention are directed to a front structure of a saddled vehicle including:

a head pipe disposed in a front portion of a vehicle body frame;

a stem shaft rotatably mounted through the head pipe, the stem shaft steerably supporting a front wheel;

a top bridge coupling the stem shaft with a handle;

a meter unit disposed in front of the top bridge, the meter unit including a meter display on a top face of the meter unit;

a meter-side coupler disposed on the meter unit; and a wiring-side coupler disposed on a side of wiring connected to the meter-side coupler;

wherein the meter unit includes a coupler support member extending behind the meter display and supporting the meter-side coupler, and the coupler support member is disposed below the top bridge.

According to the front structure of a saddled vehicle, since a meter unit includes a coupler support member extending behind the meter display and supporting the meter-side coupler, the total thickness of the meter unit is reduced. In addition, since the coupler support member is disposed below a top bridge, the meter-side and the wiring-side couplers can be hardly visible from the outside of the vehicle.

That is, according to the front structure of a saddled vehicle, the total thickness of the meter unit can be reduced, and the meter-side and the wiring-side couplers can be hardly visible from the outside of the vehicle.

The front structure of a saddled vehicle may further include a meter stay supporting the meter unit; the meter stay including, a front portion supporting the meter unit, and right and left leg portions extending rearward in a bifurcated manner from the front portion, the right and left leg portions being coupled with lower portions of the top bridge respectively;

wherein the wiring-side coupler is disposed between the right and left leg portions.

With such a structure, the wiring-side coupler is disposed between the right and left leg portions of the meter stay, and thus the right and left leg portions of the meter stay are disposed on the right and left sides of the wiring-side coupler respectively, whereby the wiring-side coupler are further hidden from the outside.

The front structure of a saddled vehicle may be structured such that, the top bridge includes, a right and left end portions, and a center portion that is offset upward, in a right-left direction, with respect to the right and left end portions, and the meter-side coupler and the wiring-side coupler are disposed under the center portion.

With such a structure, the space under the top bridge can be efficiently utilized.

The front structure of a saddled vehicle may be structured to further include a coupling portion includes an extending portion extending toward the head pipe, wherein the coupling portion is disposed on the stem shaft in the center portion.

With such a structure, the stem shaft is covered by the extending portion.

The front structure of a saddled vehicle may be structured to further include a headlight support member disposed at a front portion of the meter stay, the headlight support member supporting a headlight;

wherein the meter unit, the meter stay, and the top bridge are inclined rearward and downward as viewed from a side of the vehicle, and the meter-side coupler and the wiring-side coupler are overlapped, as viewed from the front of the vehicle, with the headlight support member and a headlight body.

With such a structure, the wiring-side and the meter-side couplers can be hardly visible from the front of the vehicle as well.

DETAILED DESCRIPTION

An embodiment of a front structure of a saddled vehicle according to the present invention will hereinafter be described with reference to the accompanying drawings. It is to be noted that the drawings shall be viewed in accordance with the direction of reference signs and numbers. In the following descriptions, the terms "front". "rear", "right", "left". "up", and "down" each refer to the direction viewed from an driver of the vehicle. In the drawings, "Fr" is used to represent the front side. "Rr" the rear side, "L" the left side, "R" the right side, "U" the upper side, and "D" the lower side of the vehicle as necessary. In the drawings, the same and the corresponding portions are indicated by the identical reference signs or numbers.

Figure 1:
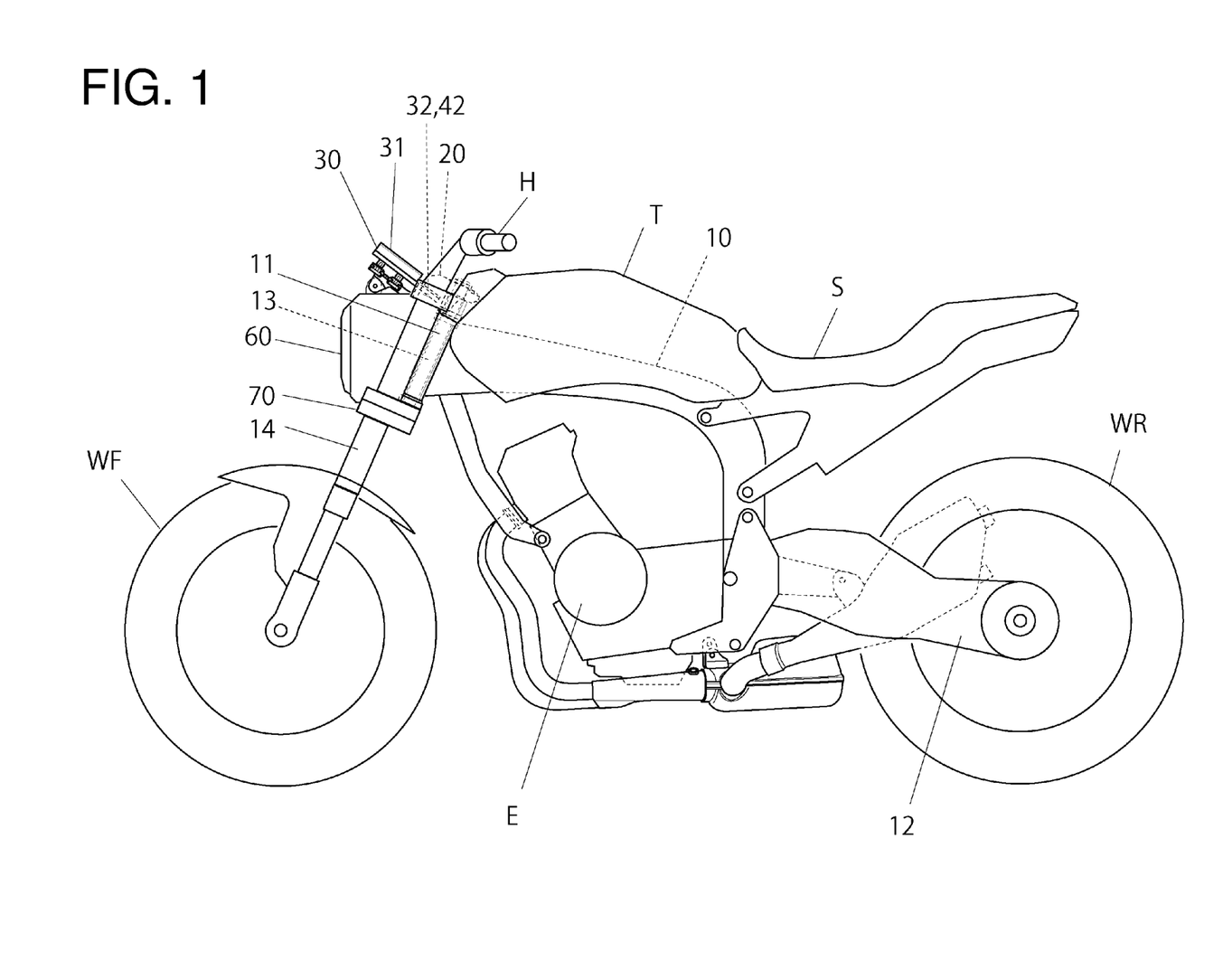
FIG. 1 is a left side view illustrating an example of a saddled vehicle that uses an embodiment of a front structure of a saddled vehicle according to the present invention.

The vehicle shown in FIG. 1 is a motorcycle as an example of a saddled vehicle which uses an embodiment of a front structure of a saddled vehicle according to the present invention.

The front structure of a saddled vehicle includes a head pipe 11 disposed in the front portion of a vehicle body frame 10, a stem shaft 13 rotatably provided through the head pipe 11 and steerably supporting a front wheel WE a top bridge 20 coupling the stem shaft 13 with a handle H, and a meter unit 30 disposed in front of the top bridge 20 and including a meter display 31 on the top face of the meter unit 30.

Figure 3:
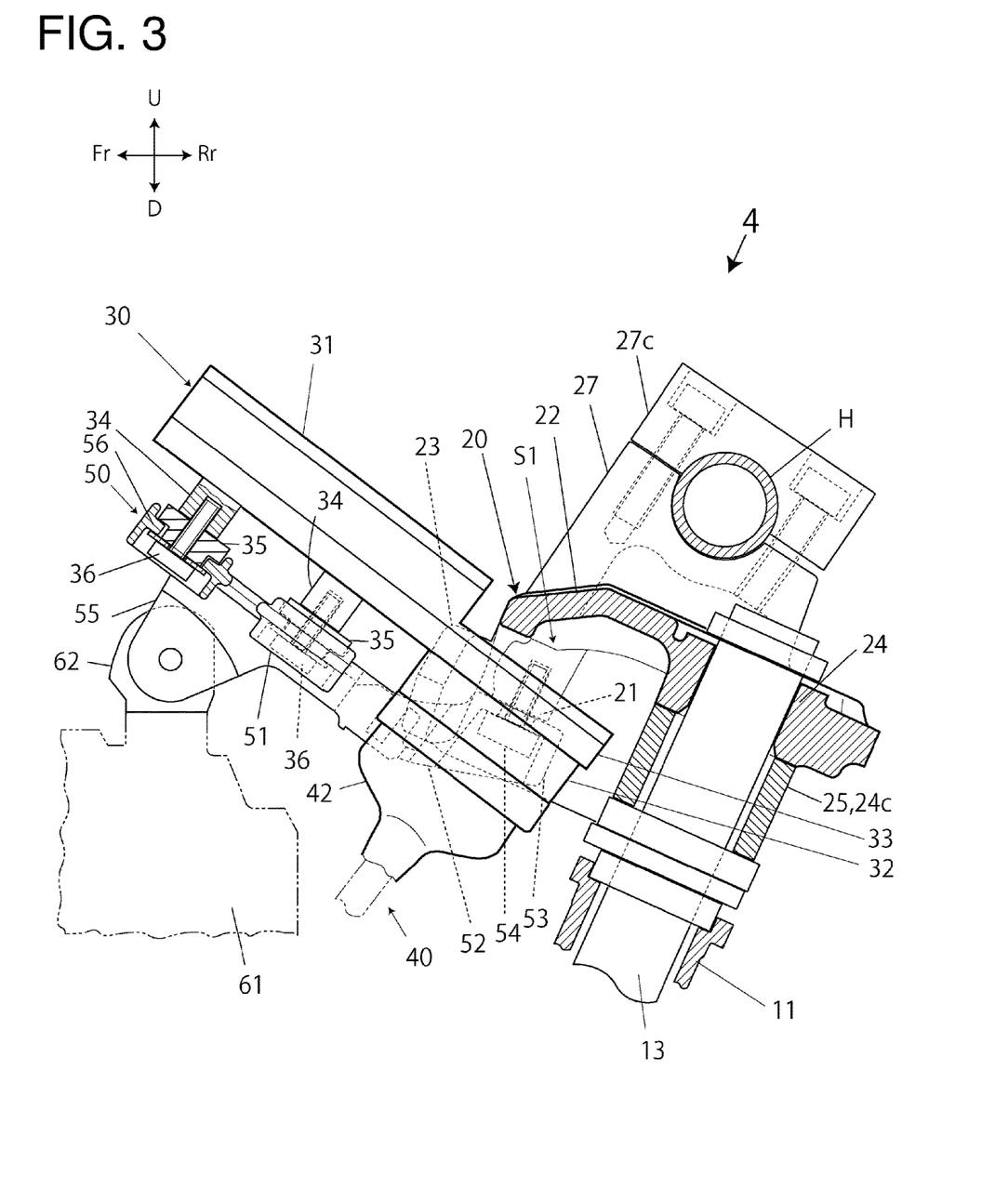
FIG. 3 is a partial cutaway perspective view taken along the line 3-3 in FIG. 2.

As illustrated in FIG. 3, the front structure of a saddled vehicle further includes a meter-side coupler 32 mounted on the meter unit 30, and a wiring-side coupler 42 provided for wiring 40 to which the meter-side coupler 32 is connected.

The meter unit 30 includes a coupler support member 33 extending behind the meter display 31 and supporting the meter-side coupler 32. The coupler support member 33 is disposed below the top bridge 20.

According to the front structure of a saddled vehicle, since the meter unit 30 includes a coupler support member 33 extending behind the meter display 31 and supporting the meter-side coupler 32, the total thickness t1 (see FIG. 5) of the meter unit 30 is reduced. In addition, the coupler support member 33 is disposed below the top bridge 20, rendering both the meter-side coupler 32 and the wiring-side coupler 42 are positioned hardly visible from the outside of the vehicle (see FIGS. 1, 2, and 4).

That is, with the front structure of a saddled vehicle, the total thickness of the meter unit 30 can be reduced, and both the meter-side coupler 32 and the wiring-side coupler 42 can be hardly visible from the outside of the vehicle.

In other words, in the front structure of a saddled vehicle, the coupler support member 33 extends in a plate-like shape behind the meter display 31, and the meter-side coupler 32 is mounted to the coupler support member 33, and thus the total thickness t2 (see FIG. 5) of the coupler support member 33 and the meter-side coupler 32 is reduced. In addition, the coupler support member 33 and the meter-side coupler 32 are disposed below the top bridge 20, and thus the top bridge 20 covers both the meter-side coupler 32 and the wiring-side coupler 42 (refer to FIGS. 3 and 4), thereby rendering both the meter-side coupler 32 and the wiring-side coupler 42 hardly visible from the outside of the vehicle. As the result, the exterior design of the vehicle is improved.

Figure 2:
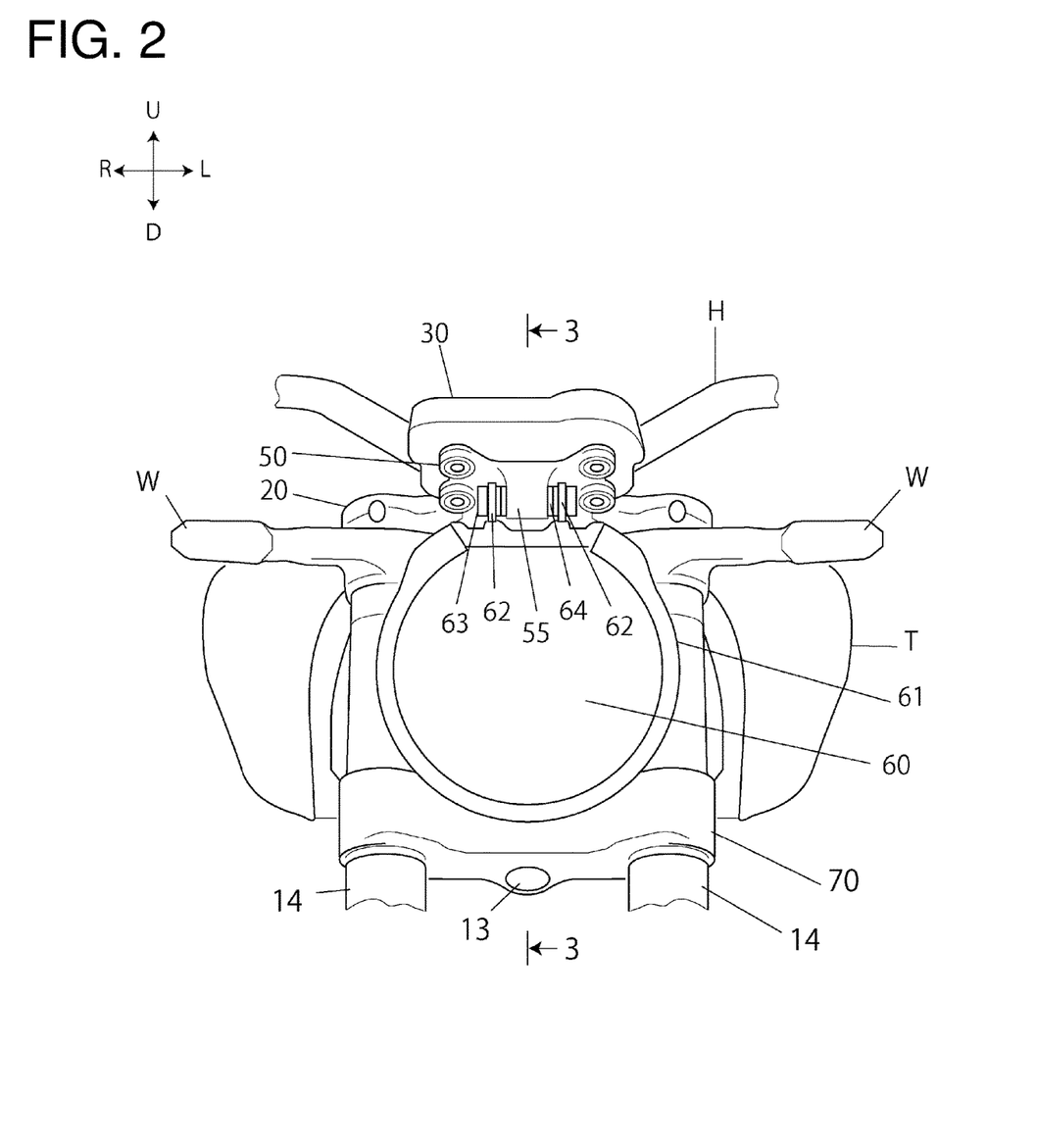
FIG. 2 is a partially enlarged front view of the embodiment of the front structure of a saddled vehicle according to the present invention.

As illustrated in FIGS. 2 and 3, the front structure of a saddled vehicle includes a meter stay 50 supporting the meter unit 30.

Figure 6A:
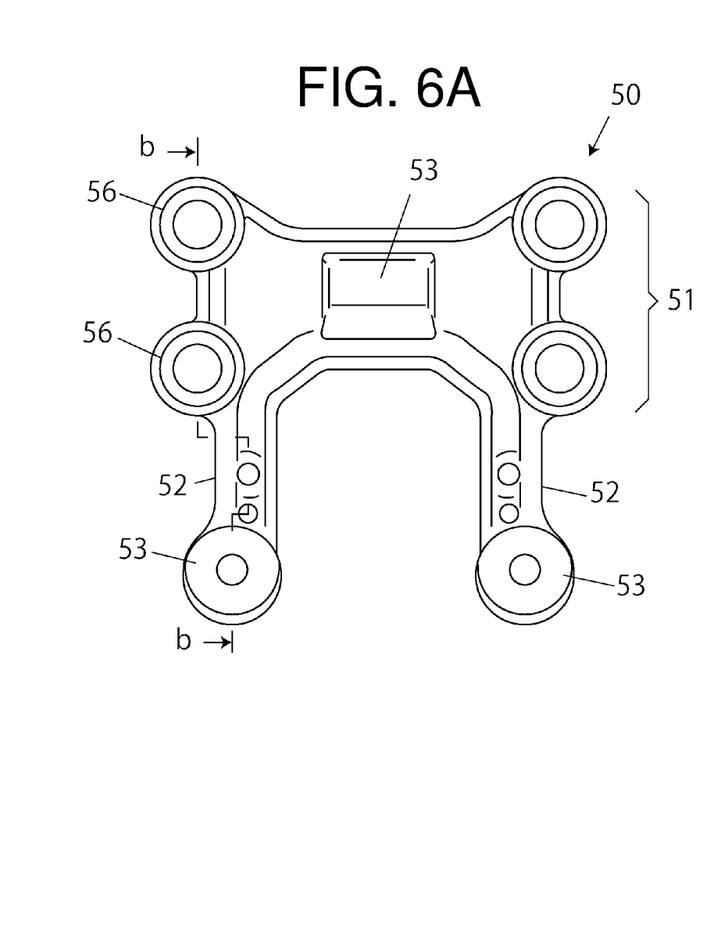
FIG. 6A is the front view of a meter stay.
Figure 6B:
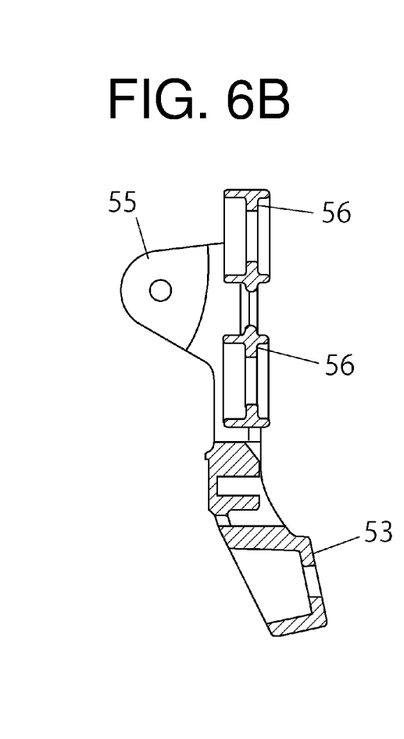
FIG. 6B is the cross-sectional view taken along the line b-b in FIG. 6A.
Figure 7A:
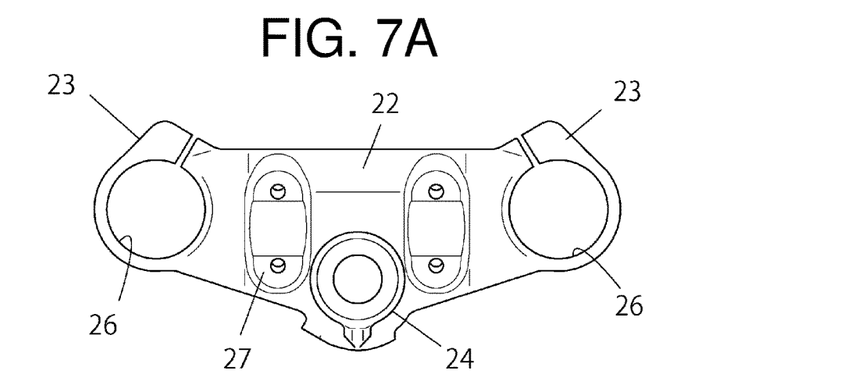
FIG. 7A is the plan view of a top bridge.
Figure 7B:
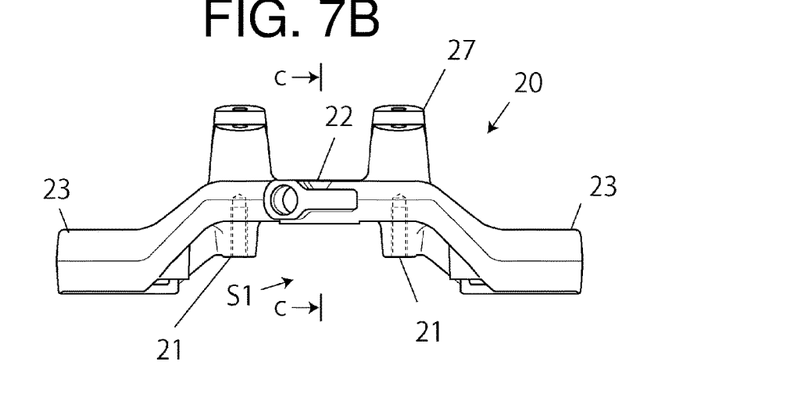
FIG. 7B is the front view of the top bridge.
Figure 7C:
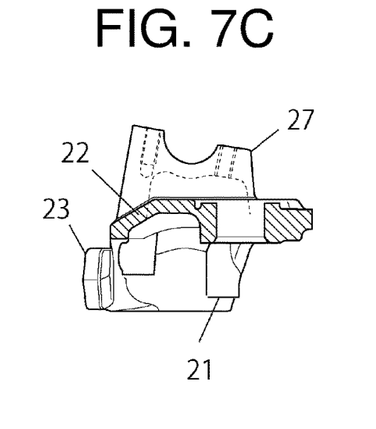
FIG. 7C is the left side view of the top bridge.
Figure 7D:
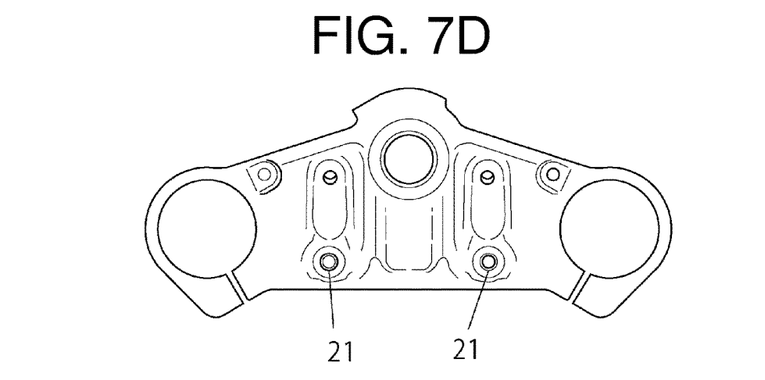
FIG. 7D is the bottom view of the top bridge.

As illustrated in FIG. 6, the meter stay 50 includes a front portion 51 supporting the meter unit 30, and right and left leg portions 52, 52 extending rearward in a bifurcated manner from the front portion so as to be coupled with a lower portions 21, 21 of the top bridge 20 respectively (see FIG. 7).

Figure 4:
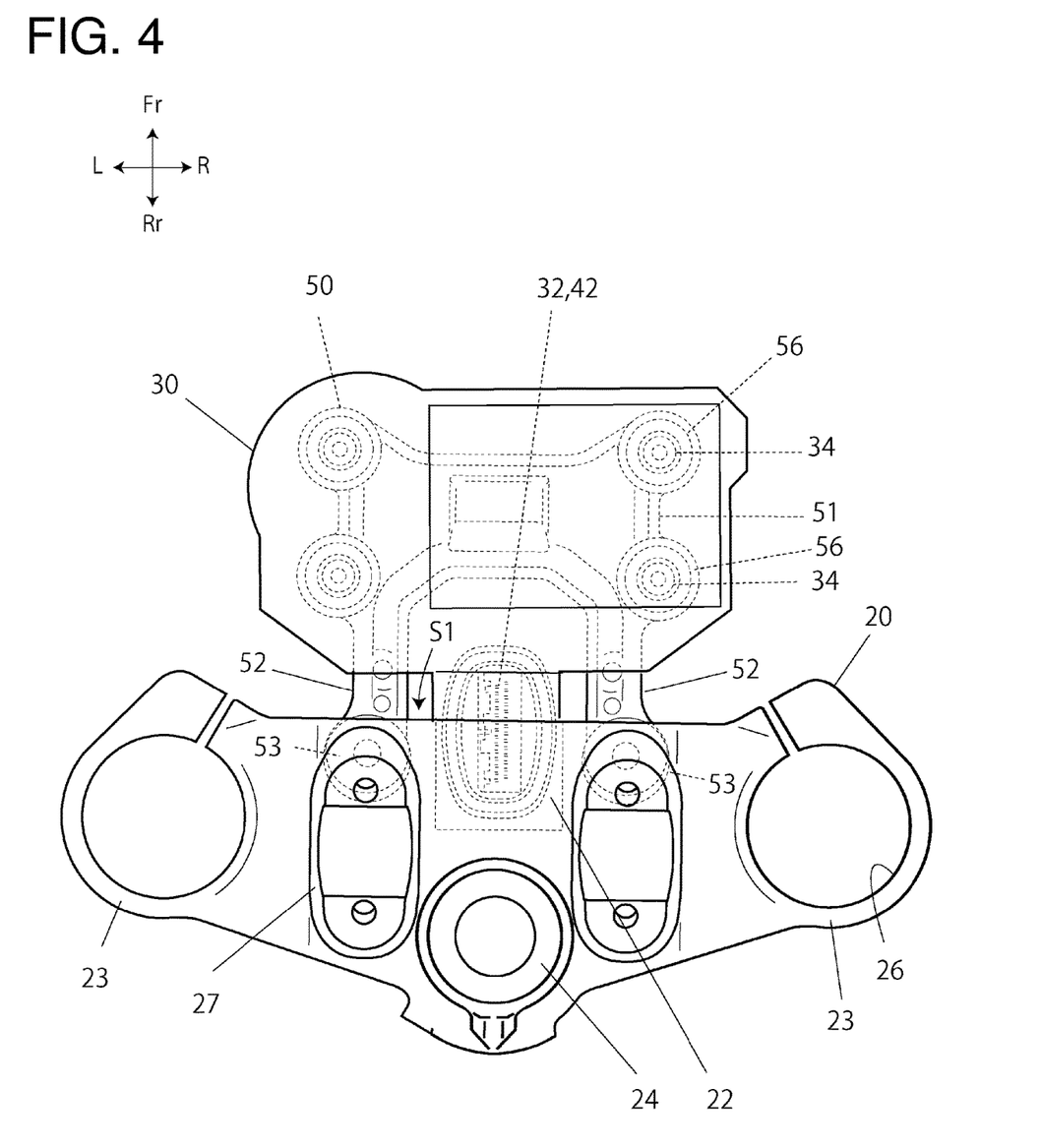
FIG. 4 is a view in the direction of the arrow 4 in FIG. 3 (a view in the axial direction of a stem shaft 13).
Figure 5A:
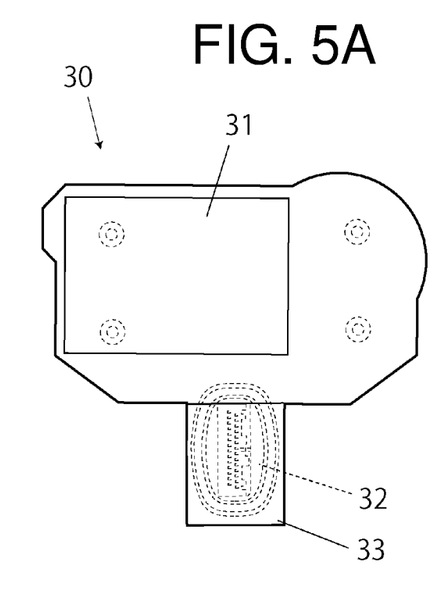
FIG. 5A is the front view of a meter unit.
Figure 5B:
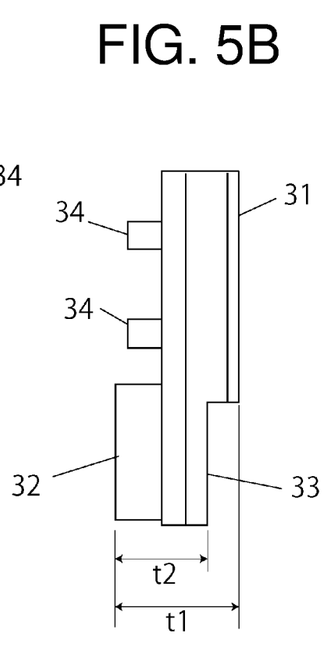
FIG. 5B is the left side view of the meter unit.
Figure 5C:
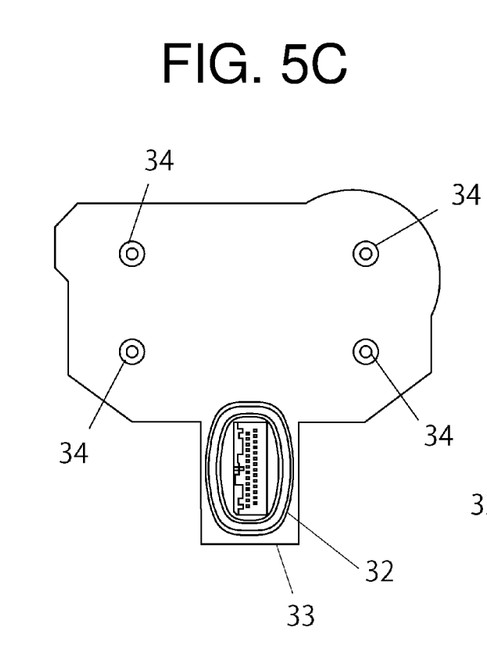
FIG. 5C is the back side view of the meter unit.

As illustrated in FIGS. 3 and 4, the wiring-side coupler 42 is disposed between the right and left leg portions 52.

With such a structure, the positioning of the wiring-side coupler 42 between the right and left leg portions 52 of the meter stay 50 allows the right and left leg portions 52 of the meter stay 50 to be disposed on the right and left sides of the wiring-side coupler 42 respectively, allowing the wiring-side coupler 42 to be further hidden from view externally.

Concurrently, the wiring 40 around the wiring-side coupler 42 becomes hardly visible as well.

In the present embodiment, since the meter-side coupler 32 is also disposed between the right and left leg portions 52, the meter-side coupler 32 is also hardly visible from the outside.

As illustrated in FIG. 3, the right and left leg portions 52 are fixed to the lower portions 21 of the top bridge 20 by fastening fixing portions 53 of the right and left leg portions 52, with bolts 54 respectively.

The meter unit 30 has fixing portions 34 provided on the bottom face of the meter unit 30, and each of the fixing portions 34 is fastened and fixed to an attaching portion 56 using a bolt 36 with a buffer member (rubber bush) 35 interposed between the fixing portion 34 and the attaching portion 56, the attaching portion 56 being provided in the front portion 51 of the meter stay 50.

As illustrated in FIGS. 3 and 7, in the right-left direction of the top bridge 20, a center portion 22 of the top bridge 20 is offset upward with respect to right and left end portions 23 of the top bridge 20. As illustrated in FIGS. 3 and 4, the meter-side coupler 32 and the wiring-side coupler 42 are disposed under the center portion 22.

With such a structure, a space S1 under the top bridge 20 can be efficiently utilized.

As illustrated in FIG. 3, a collar 25 is provided between the head pipe 11 and a coupling portion 24 coupled with the stem shaft 13, the coupling portion 24 being disposed on the center portion 22 of the top bridge 20.

In place of the collar 25, the coupling portion 24 coupled with the stem shaft 13 and disposed on the center portion 22 of the top bridge 20 may be provided integrally with an extending portion 24c that extends toward the head pipe 11.

With such a structure, the stem shaft 13 can be covered by the extending portion 24c without using the collar 25 as another component.

As illustrated in FIGS. 2, 3, and 6, the front portion 51 of the meter stay 50 includes a headlight support member 55 supporting a headlight 60.

In addition, the meter unit 30, the meter stay 50, and the top bridge 20 are inclined rearward and downward as viewed from a side of the vehicle (see FIG. 3), and both the wiring-side coupler 42 and the meter-side coupler 32 are overlapped with both the headlight support member 55 and the headlight body 61 as viewed from the front of the vehicle.

With such a structure, both the wiring-side coupler 42 and the meter-side coupler 32 are, as illustrated in FIG. 2, hardly visible from the front of the vehicle as well.

The reference signs W, W in FIG. 2 denote blinkers respectively disposed on the right and left positions of the meter stay 50.

On the headlight support member 55, fixing portions 62 of the headlight 60 are fixed and fastened using a bolt nut 63 with a buffer member 64 interposed between the headlight support member 55 and the mounting portion 62.

As described above, the top bridge 20 is coupled with the upper end of the stem shaft 13, and a bottom bridge 70 is mounted on the lower end of the stem shaft 13 as illustrated in FIGS. 1 and 2. The top bridge 20 and the bottom bridge 70 support a pair of right and left front forks 14, and the lower ends of the front forks 14 support a front wheel WF. The reference number 26 in FIG. 7A denotes fixing portions through which the front forks 14 are fixed.

As illustrated in FIG. 3, the top bridge 20 is provided with handle fixing members 27, and the handle H is fixed to the handle fixing members 27 with handle clampers 27c.

As illustrated in FIG. 1, behind the vehicle body frame 10, a rear wheel WR is supported by swing arms 12. The rear wheel WR is driven by an engine E that is mounted on the vehicle body frame 10.

The reference sign T denotes a fuel tank, and the sign S denotes a seat a driver sits on.

The above described embodiments of the present invention do not limit the present invention and can be appropriately modified without departing from the gist of the present invention.

REFERENCE SIGNS LIST 10 vehicle body frame
11 head pipe
13 stem shaft
20 top bridge
22 center portion
4 coupling portion coupled with stem shaft
24c extending portion
30 meter unit
31 meter display
32 meter-side coupler
33 coupler support member
42 wiring-side coupler
50 meter stay
51 front portion
52 leg portion
55 headlight support member
60 headlight
H handle

What is claimed is:

1. A front structure of a saddled vehicle, comprising:
   a head pipe disposed in a front portion of a vehicle body frame;
   a stem shaft rotatably mounted through the head pipe, the stem shaft steerably supporting a front wheel;
   a top bridge coupling the gem shaft with a handle;
   a meter unit disposed in front of the top bridge, the meter unit including a meter display on a top face of the meter unit;
   a meter-side coupler disposed on the meter unit; and
   a wiring-side coupler disposed on a side of wiring connected to the meter-side coupler;
   wherein the meter unit includes a coupler support member extending behind the meter display and supporting the meter-side coupler,
   the coupler support member is disposed below the top bridge, and
   the coupler support member at least partially overlaps the top bridge in a vertical direction.

2. The front structure of a saddled vehicle according to claim 1, further comprising:
   a meter stay supporting the meter unit; the meter stay including,
      a front portion supporting the meter unit, and
      right and left leg portions extending rearward in a bifurcated manner from the front portion, the right and left leg portions being coupled with lower portions of the top bridge respectively;
   wherein the wiring-side coupler is disposed between the right and left leg portions.

3. The front structure of a saddled vehicle according to claim 2, further comprising:
   a headlight support member disposed at a front portion of the meter stay, the headlight support member supporting a headlight;
   wherein the meter unit, the meter stay, and the top bridge are inclined rearward and downward as viewed from a side of the vehicle, and the meter-side coupler and the wiring-side coupler are overlapped, as viewed from the front of the vehicle, with the headlight support member and a headlight body.

4. The front structure of a saddled vehicle according to claim 2, wherein
   the top bridge includes,
      a right and left end portions, and
      a center portion that is offset upward, in a right-left direction, with respect to the right and left end portions, and
   the meter-side coupler and the wiring-side coupler are disposed under the center portion.

5. The front structure of a saddled vehicle according to claim 4, further comprising:
   a coupling portion includes an extending portion extending toward the head pipe,
   wherein the coupling portion is disposed on the stem shaft in the center portion.

6. The front structure of a saddled vehicle according to claim 5, further comprising:
   a headlight support member disposed at a front portion of the meter stay, the headlight support member supporting a headlight;
   wherein the meter unit, the meter stay, and the top bridge are inclined rearward and downward as viewed from a side of the vehicle, and the meter-side coupler and the wiring-side coupler are overlapped, as viewed from the front of the vehicle, with the headlight support member and a headlight body.

7. The front structure of a saddled vehicle according to claim 4, further comprising:
   a headlight support member disposed at a front portion of the meter stay, the headlight support member supporting a headlight;
   wherein the meter unit, the meter stay, and the top bridge are inclined rearward and downward as viewed from a side of the vehicle, and the meter-side coupler and the wiring-side coupler are overlapped, as viewed from the front of the vehicle, with the headlight support member and a headlight body.

8. The front structure of a saddled vehicle according to claim 1, wherein
   the top bridge includes,
      a right and left end portions, and
      a center portion that is offset upward, in a right-left direction, with respect to the right and left end portions, and
   the meter-side coupler and the wiring-side coupler are disposed under the center portion.

9. The front structure of a saddled vehicle according to claim 8, further comprising:
   a coupling portion includes an extending portion extending toward the head pipe,
   wherein the coupling portion is disposed on the stem shaft in the center portion.

10. The front structure of a saddled vehicle according to claim 9, further comprising:
    a headlight support member disposed at a front portion of the meter stay, the headlight support member supporting a headlight;
    wherein the meter unit, the meter stay, and the top bridge are inclined rearward and downward as viewed from a side of the vehicle, and the meter-side coupler and the wiring-side coupler are overlapped, as viewed from the front of the vehicle, with the headlight support member and a headlight body.

11. The front structure of a saddled vehicle according to claim 8, further comprising:
    a headlight support member disposed at a front portion of the meter stay, the headlight support member supporting a headlight;
    wherein the meter unit, the meter stay, and the top bridge are inclined rearward and downward as viewed from a side of the vehicle, and the meter-side coupler and the wiring-side coupler are overlapped, as viewed from the front of the vehicle, with the headlight support member and a headlight body.

* * * * *